(12) United States Patent
Villano et al.

(10) Patent No.: US 9,980,591 B2
(45) Date of Patent: May 29, 2018

(54) PLAYMAT

(71) Applicant: Skip Hop, Inc., New York, NY (US)

(72) Inventors: Janet Villano, Jersey City, NJ (US); Ellen Diamant, New York, NY (US)

(73) Assignee: SKIP HOP, INC., New York, NY (US)

( * ) Notice: Subject to any disclaimer, the term of this patent is extended or adjusted under 35 U.S.C. 154(b) by 0 days. days.

(21) Appl. No.: 15/057,937

(22) Filed: Mar. 1, 2016

(65) Prior Publication Data

US 2017/0251855 A1 Sep. 7, 2017

(51) Int. Cl.
*A47G 27/02* (2006.01)
*A47D 15/00* (2006.01)

(52) U.S. Cl.
CPC ....... *A47G 27/0218* (2013.01); *A47D 15/003* (2013.01)

(58) Field of Classification Search
CPC .... A47G 27/018; A47G 9/062; A47D 15/003; A63B 21/4037; A63F 9/10; A63F 9/12; A63H 33/04; A63H 33/06; A63H 33/086; A63H 33/082
See application file for complete search history.

(56) References Cited

U.S. PATENT DOCUMENTS

| 232,140 | A | * | 9/1880 | Mason | A63F 9/10 |
| | | | | | 273/157 R |
| 487,798 | A | * | 12/1892 | Thurston | A63F 9/12 |
| | | | | | 273/156 |
| 490,689 | A | * | 1/1893 | Thurston | A63F 9/12 |
| | | | | | 273/156 |
| 3,093,870 | A | * | 6/1963 | Brock | A47G 27/0218 |
| | | | | | 15/215 |
| 3,701,214 | A | | 10/1972 | Sakamoto | |
| 4,287,693 | A | | 9/1981 | Collette | |
| 4,886,477 | A | | 12/1989 | Ziegler | |
| 5,212,842 | A | * | 5/1993 | Glydon | A63H 33/04 |
| | | | | | 428/44 |
| 5,330,806 | A | * | 7/1994 | Bythewood | A47G 9/062 |
| | | | | | 428/33 |

(Continued)

FOREIGN PATENT DOCUMENTS

| CN | 2 337 895 | 9/1999 |
| EP | 0890373 | 1/1999 |

(Continued)

OTHER PUBLICATIONS https://www.alibaba.com/product-detail/2014-New-product-Tri-angle-EVA-interlocking_60011270238.html, "2014 New product Triangle EVA interlocking foam mat/Triangle Taekwondo foam mats", Photos dated May 11, 2012.*

(Continued)

*Primary Examiner* — Eric J Kurilla
(74) *Attorney, Agent, or Firm* — Stephen J. Weyer, Esq.; Stites & Harbison, PLLC.

(57) ABSTRACT

A playmat system includes a series of isosceles right triangle tiles and edge tiles. Advantageously, the triangle shaped tiles and edge tiles have one or of two color or patterns or more. The triangle shaped tiles and edge tiles have complementary edges which allow the triangle tiles to be interlockingly engaged with one another along either hypotenuse edges or like edges to thereby produce a number of different patterns when laid out and interconnected.

20 Claims, 7 Drawing Sheets

(56) References Cited

U.S. PATENT DOCUMENTS

| | | | |
|---|---|---|---|
| 5,368,301 A | 11/1994 | Mitchell | |
| 5,405,146 A * | 4/1995 | Washington | A47G 1/0605 273/157 R |
| 5,907,934 A | 6/1999 | Austin | |
| 6,128,881 A * | 10/2000 | Bue | E04F 15/02 52/177 |
| 6,189,283 B1 * | 2/2001 | Bentley | E04F 15/02 52/457 |
| D492,426 S * | 6/2004 | Strickler | D25/138 |
| 7,275,350 B2 * | 10/2007 | Pervan | E04C 2/20 52/581 |
| 7,470,166 B2 * | 12/2008 | Allen | A63H 18/00 446/108 |
| 8,210,892 B2 * | 7/2012 | Thrush | A63F 9/1288 446/108 |
| 8,806,822 B1 | 8/2014 | Wang | |
| 9,070,300 B1 | 6/2015 | Mohanty | |
| 9,289,085 B2 * | 3/2016 | Thrush | B32B 3/02 |
| 2004/0258869 A1 | 12/2004 | Walker | |
| 2005/0210809 A1 * | 9/2005 | Nevison | E04F 15/105 52/578 |
| 2006/0097448 A1 | 5/2006 | Kinberg | |
| 2006/0127647 A1 | 6/2006 | Thrush | |
| 2007/0182094 A1 | 8/2007 | Lee | |
| 2007/0238537 A1 | 10/2007 | Allen | |
| 2008/0220219 A1 | 9/2008 | Lai | |
| 2009/0056016 A1 | 3/2009 | Zack et al. | |
| 2009/0127785 A1 * | 5/2009 | Kishon | A63F 9/1044 273/157 R |
| 2010/0194039 A1 | 8/2010 | Thrush et al. | |
| 2012/0021148 A1 | 1/2012 | Thrush et al. | |
| 2012/0238179 A1 | 9/2012 | Thrush et al. | |
| 2013/0291474 A1 * | 11/2013 | Tillery | E04F 15/02 52/588.1 |
| 2014/0333022 A1 | 11/2014 | Wang | |
| 2015/0014931 A1 * | 1/2015 | Pabon | A63F 9/10 273/271 |
| 2015/0164258 A1 | 6/2015 | Thrush et al. | |
| 2016/0129299 A1 * | 5/2016 | Newman | A63B 21/4037 482/142 |

FOREIGN PATENT DOCUMENTS

| | | |
|---|---|---|
| FR | 2258599 | 8/1975 |
| GB | 2 370 001 | 6/2002 |
| WO | WO-2015/006855 | 1/2015 |

OTHER PUBLICATIONS

"Triangle EVA Interlocking Foam Mat/Triangle Taekwondo Foam Mats"—http://www.alibaba.com/product-detail/2014-New-product-Triangle-EVA-interlocking_60011270238.html; (Date of Access—Aug. 24, 2015).

"High Density EVA Foam Interlocking Floor Tiles Fitness Exercise Home Office Gym Play Mats"—http://www.amazon.ca/Soozier-Density-Interlocking-Fitness-Exercise/dp/B00ZQGF0M6/ref=pd_sim_sbs_200_7?ie=UTF8 &refRID=085FEBNAZZ8GQAZ3CMPW; (Date of Access—Aug. 24, 2015).

"8-Piece Pastel Foam Mat Tapered Corners"—http://www.ginnys.com/Gifts-and-Toys/Toys/Learning-Building-and-Musical/8-Piece-Pastel-Foam-Mat-Tapered-Corners.pro?omSource=SLI&; (Date of Access—Aug. 24, 2015).

"Foam Puzzle Mat"—http://www.floorcovers.com/FOAM-PUZZLE-MAT-986/; (Date of Access—Aug. 24, 2015).

European Search Report dated Dec. 18, 2017 in corresponding European Application No. 17 15 8215.

* cited by examiner

PLAYMAT

FIELD OF INVENTION

The present invention relates to a playmat and in particular a playmat composed of a series of interlocking tiles.

BACKGROUND OF THE INVENTION

Infants and toddlers often engage in play activity on the floor. In order to provide a suitable play surface, playmats have been developed for placement on the floor so that an infant or toddler can play on the mat. Often, the playmats are composed of a foam or spongy material in order to provide a cushioned surface upon which a child can play. A recent development in playmats is the introduction of playmats composed of a series of interlocking tiles. The interlocking tiles allow one to set up a playmat of a desired size by interlocking the tiles with one another. This allows one to produce a playmat of a suitable variable size and for easy disassembly and storage or transport of the floor mat tiles when not laid out on the floor as an assembled playmat.

SUMMARY OF THE INVENTION

The present invention relates to a play mat system which comprises a series of right isosceles triangle shaped tiles and edge tiles. The isosceles triangle shaped tiles interlock with one another to form a play mat with the plurality of edge tiles going along an outside perimeter to produce an assembled playmat. The triangle shaped tiles have at least one of two patterns or colors so that one can arrange and interlock the triangle tiles with one another to form numerous different patterns. For example, the playmat system can have triangle tiles in two different colors which allow one to produce many different possible patterns.

Advantageously, the triangle shaped tiles have a right isosceles triangle shape with a series of projections or recesses along each of its three edges i.e. its two leg edges and its hypotenuse edge which form the right triangle. The projections and recesses allow each triangle tile to be joined to another triangle tile in an interlocking or mating arrangement. Further, each leg edge of any one triangle tile can interlock with both legs of any other tile completely along its respective edge which thereby produces either a new isosceles triangle, twice the size of any one triangle tile or a parallelogram, depending on the orientation of the two triangle tiles mated with each other. A plurality of edge tiles have a substantially straight edge on one side and on the opposite side, an edge with a series of projections and recesses which are complementary to, and matingly engage with, the projections and recesses on the leg edges of the triangle tiles. This allows the edge tiles to interlock with the leg edges of the triangle tiles to form a substantially straight edge around a perimeter of the play mat when one lays out the triangle tiles and interlocks or mates them with one another such as on the floor. Like the triangle shaped tiles, advantageously, different edge tiles can have one of the two patterns or colors which are the same two patterns or color as that of the triangle tiles.

In one advantageous form, the playmat system has at least eight triangle shaped tiles and in one further form, half of the at least eight triangle tiles have a front surface within a first pattern or color and the other half of the at least eight triangles have a front surface in a second pattern or color. Of course, the pattern or color can be continued on all sides and surfaces of each triangle tile.

In one yet another advantageous form, the triangle tiles and edge tiles are composed of foam. In yet another alternative form, the front surface of the triangle tiles are textured and the bottom surfaces are smooth.

In a further specific alternative embodiment, the play mat system has at least 18 triangle tiles. For example in one further form, at least half of the 18 tiles have a front surface in a first pattern of color and the other half of the at least 18 triangles have a second pattern or color. Alternatively, each quarter of at least 18 triangles have a front surface in one of the four patterns or colors respectively.

In yet another further advantageous form, the plurality of edge tiles comprise three different types of tiles namely a straight edge tile, right corner tile and left corner tile. Using the three different styles of edge tiles, one can assemble a perimeter around laid out, interconnected triangle tiles to produce a straight edge along an entire perimeter of a playmat.

In yet another alternative form, the at least eight triangle tiles comprises at least 40 triangle tiles in which a front surface of half of the tiles have a first pattern or color and the other half of the triangle tiles have a second pattern or color. In an alternative form, each quarter of at least 40 triangle tiles have a respective one of four patterns or colors.

The present invention, in one form thereof, is directed to a playmat system having at least eight right isosceles triangle shaped tiles. Each tile has two triangle leg edges which form a right angle and a hypotenuse edge, opposite the right angle. Each triangle tile has a front surface and a bottom surface. Each front surface has one of at least two patterns or colors such that at least one of the eight right triangle tiles has a first pattern or color and at least another has a second pattern or color. Each triangle shaped tile has a series of projections and recesses along the two leg edges and the hypotenuse edge. Each leg edge of any one triangle tile can matingly engage with both leg edges of any other triangle tile completely along each respective tile mating edge, thereby forming either a new isosceles triangle twice the size of any one triangle tile or a parallelogram depending on orientation of one of the mating triangle tiles relative to the other mating triangle tile. A plurality of edge tiles each have a substantially straight edge and an opposite edge with a series of projections and recesses which are complementary to, and matingly engaged with projections and recesses in the leg edges of the triangle tiles. Each edge tile has front surface having at least one of the first or second patterns or colors.

In one advantageous form, half of the at least eight triangles have a front surface in the first pattern or color and the other half have the second pattern or color.

In one further advantageous form, the at least eight triangle shaped tiles comprise at least 40 triangles. In one further form, half of the at least 40 triangles have a front surface in the first pattern and the other half have a front surface in the second pattern or color. In one alternative further form, a quarter of the triangle tiles have a respective one of four patterns of colors.

DETAILED DESCRIPTION

Figure 1:
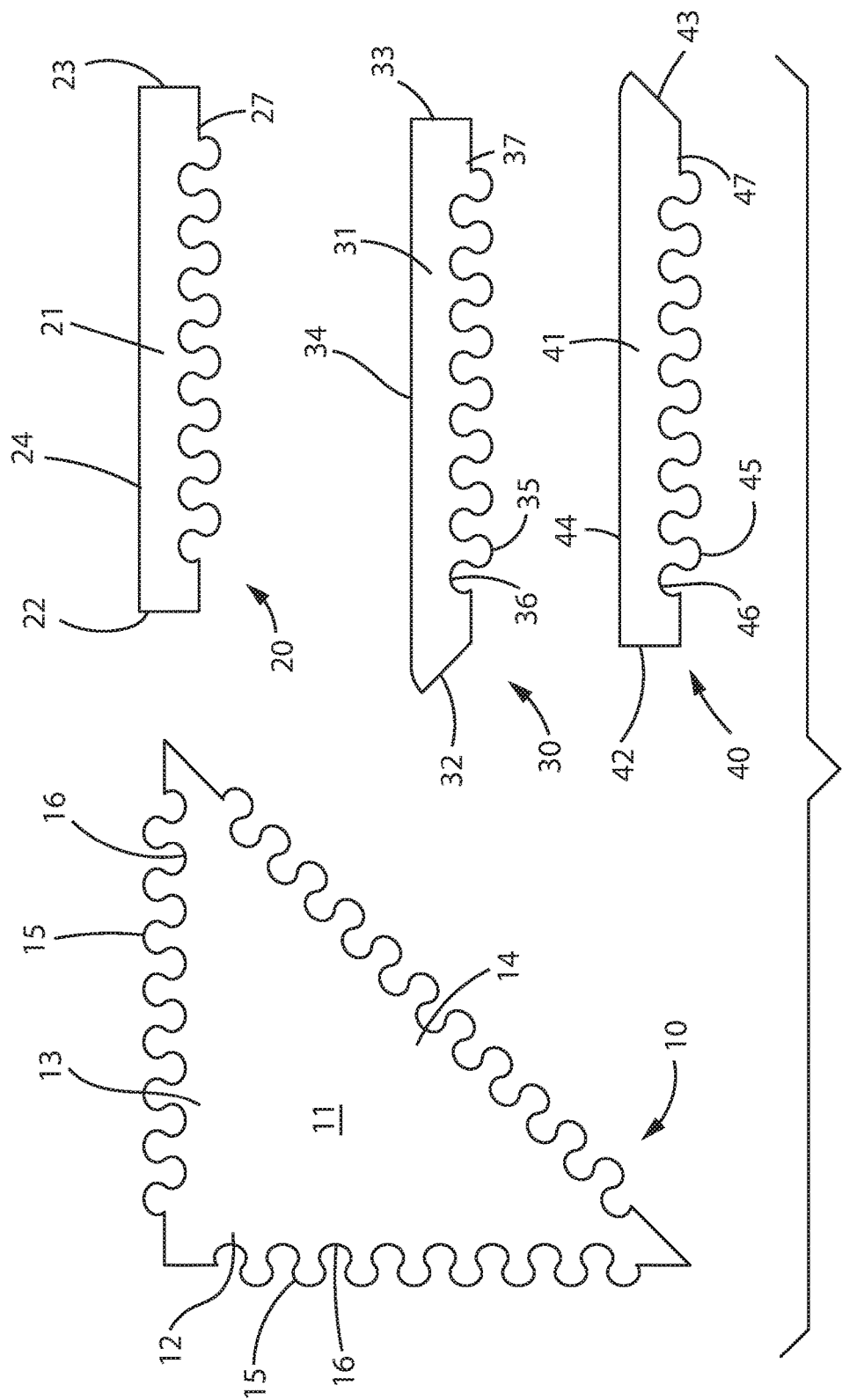
FIG. 1 is a top plan view of four tiles of a playmat system in accordance with the present invention.
Figure 2:
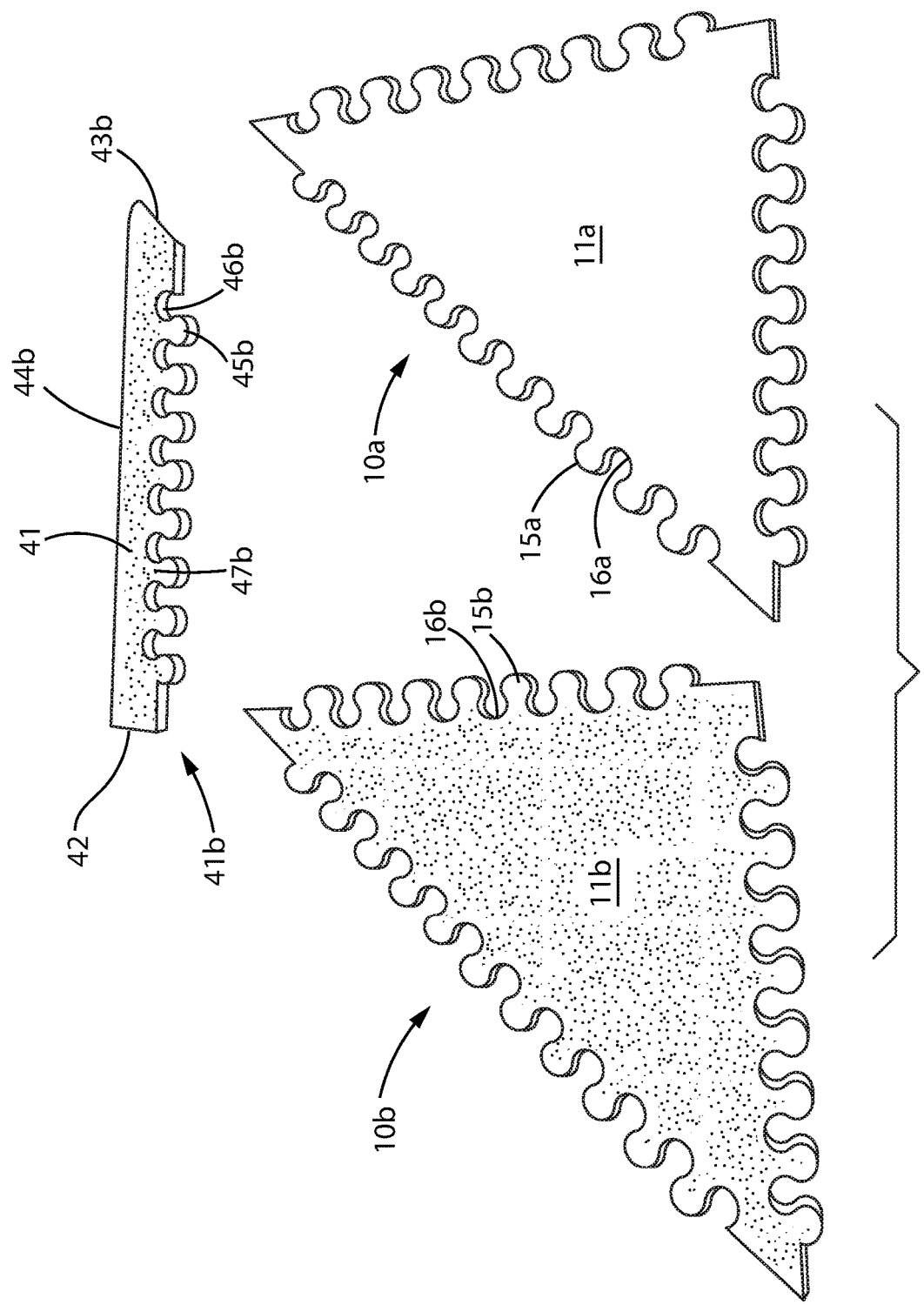
FIG. 2 is a perspective view of two triangle tiles (one black, one white) and one edge tile (black) of a playmat system in accordance with the present invention.

The present invention will now be described with reference to the figures. Referring specifically to FIGS. 1 and 2, the playmat system is composed of a series of triangle shaped tiles 10 and edge tiles such as straight edge tile 20, right corner tile 30 and left corner tile 40. Each triangle tile 10 and edge tile 20, 30, 40 has a textured front surface 11, 21, 31, 41 and a smooth bottom surface (not shown) opposite the top surface 11, 21, 31, 41. Advantageously, triangle tile 10 and edge tiles 20, 30, 40 are produced of foam or other suitably soft material. Further, each top surface 11, 21, 31, 41 has a pattern or color. For instance as shown in FIG. 2, triangle tile 10a has a white surface 11a and triangle 10b has a black color surface 11b. Further, as shown in FIG. 2, the respective white color and black color are carried through each respective tile 10a, 10b. However, it is possible to have the differing color or pattern appear only on the top surfaces 11a, 11b.

Each triangle shaped tile 10 has two right angle triangle leg edges 12, 13 and a hypotenuse edge 14. Along all three edges 12, 13, 14 are a series of projections 15 and recesses 16.

Straight edge tile 20 has a substantially straight edge 24 and two side edges 22 and 23 which are parallel to each other and perpendicular to the substantially straight edge 24. A mating or interlocking side or edge 27 of straight edge tile 20, is opposite straight edge 24, and has a series of projections 25 and recesses 26 which are complementary to recesses 16 and projections 15, respectively of triangle tile 10 to thereby allow joining, mating or interlocking straight edge tile 20 along either leg edge 12, 13 of triangle tile 10. The projections 35 and recesses 36 of right corner tile 30 allows it to be joined to leg edges 12, 13 of tile 10.

The right corner tile 30 has one side 33 which is perpendicular to a substantially straight edge 34 on its right side. On a left side of right corner tile 30 is an angled edge 32 which forms an angle of 45 degrees with the straight edge 34 and is angled towards the right side edge 33 towards projections and recessed edge 35. The side 35 opposite the straight edge 34 has a series of projections 35 and recesses 36. The projections 35 and recesses 36 are complementary to recesses 16 and projections 15, respectively of triangle tile 10.

Left corner tile 40 has a left edge 42 perpendicular to straight edge 44. The left corner tile 40 has a right edge which forms a 45° angle with the straight edge 44 and the right side angled edge is angled inward towards the left side edge 42, and towards a series of projections and recesses 45, 46 on edge 47. The projections 45 and recess 46 are complementary to and made with the recesses 16 and projections 15 respectively of triangle tile 10 allowing the left corner tile 40 to mate with and interlockingly engage with leg edges 12, 13 of triangle tile 10.

Figure 3:
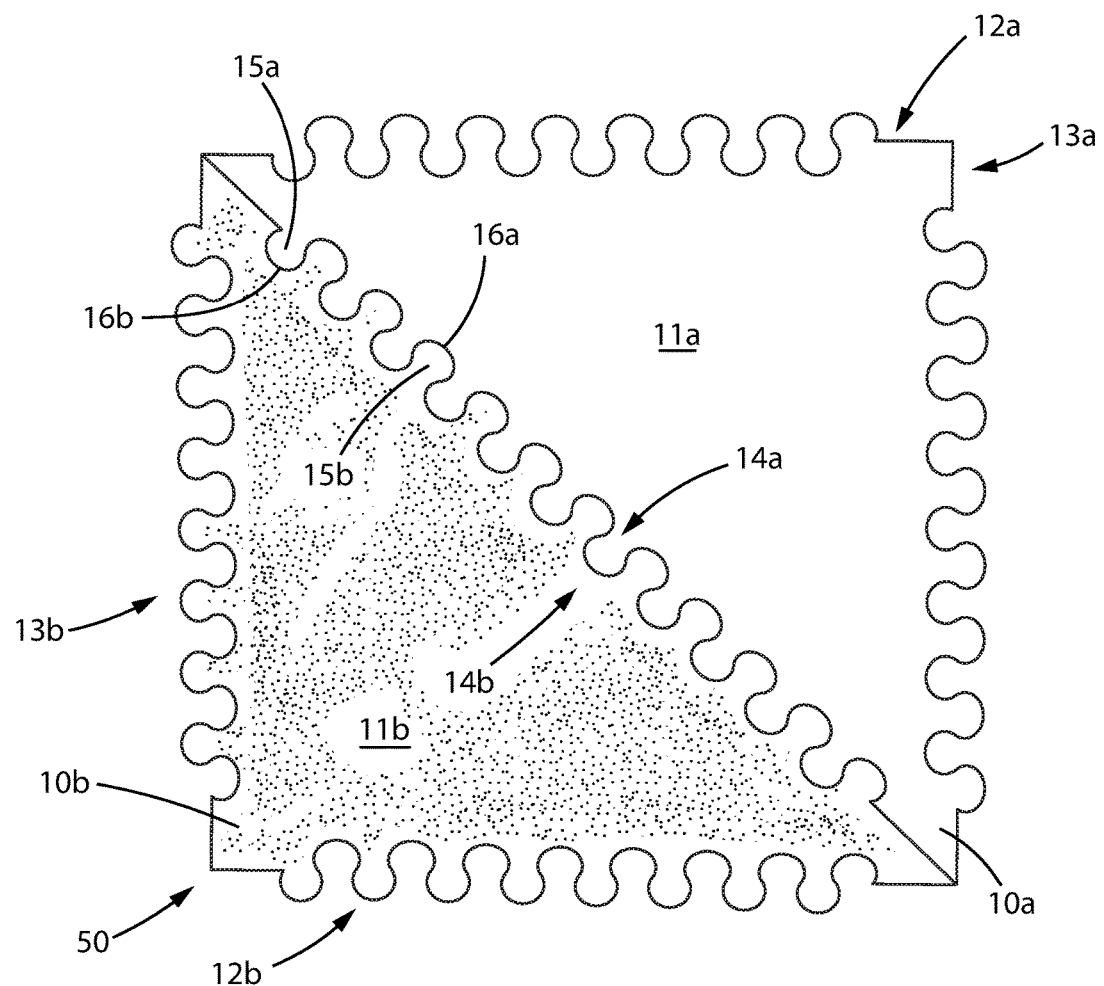
FIG. 3 illustrates two triangle tiles interlocking with one another to form a square.

Referring now to FIG. 3 along with FIG. 2, triangle tile 10a can matingly engage with triangle tile 10b to form a square 50 as shown in FIG. 3. The plurality of protuberances 15a lockingly engages with or mates with a complementary recess 16b of tile 10b along the complete respective hypotenuse sides 14a, 14b of triangle tiles 10a, 10b to form the complete square 50 as shown in FIG. 3.

Figure 4:
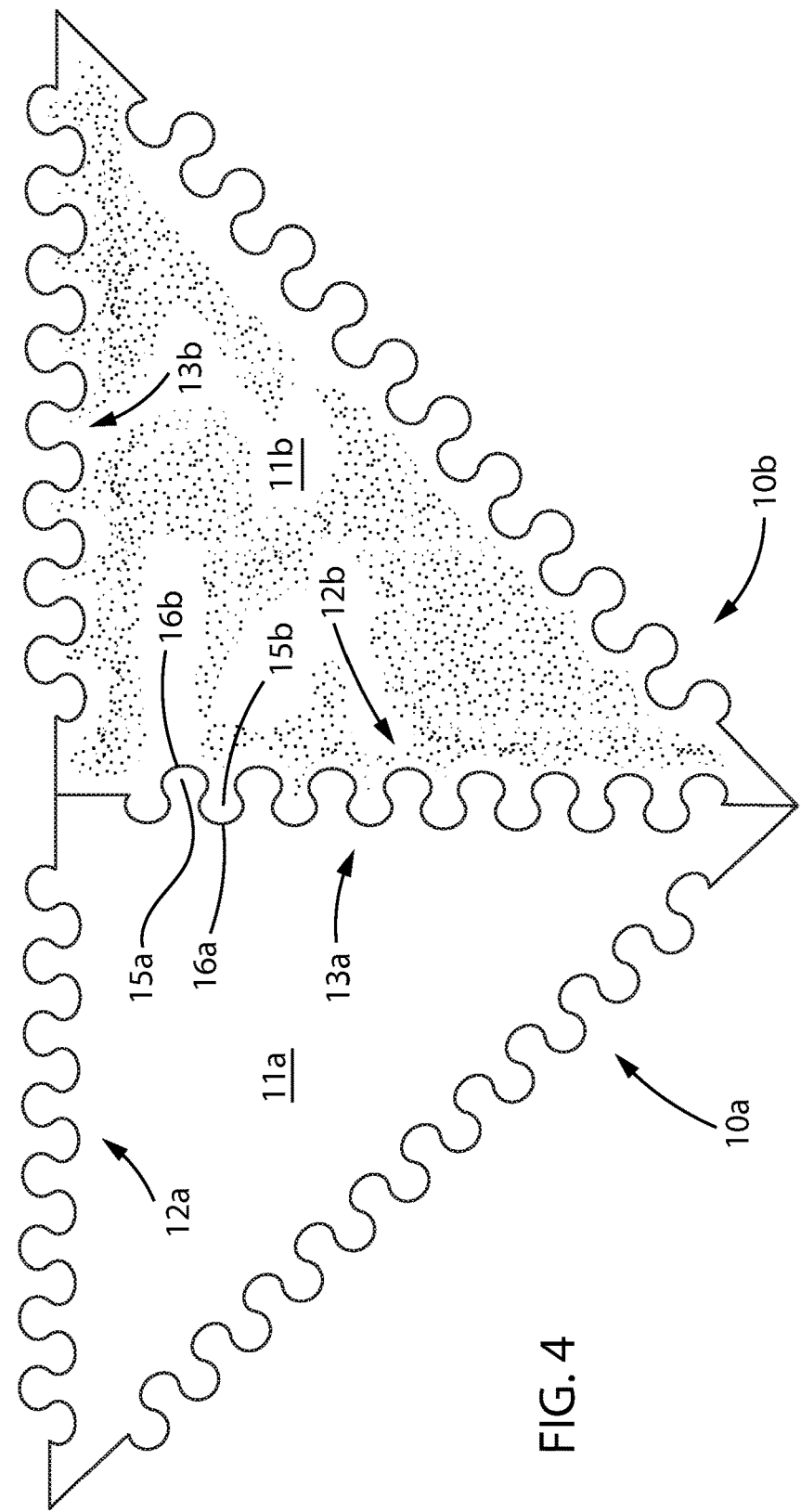
FIG. 4 illustrates two triangle chip tiles joined together at respective right triangle leg edges to form an isosceles triangle twice the size of each individual triangle in accordance with the present invention.

Referring to FIG. 4 along with FIG. 2, triangle tile 10a is shown joined to or mated with triangle tile 10b along respective right leg edges 13a and 12b. The result is a new isosceles triangle 60 which is a right isosceles triangle about twice the size of each tile 10a and 10b. The leg edge 12b of triangle tile 10b and leg edge 13a of triangle tile 10a mates completely along each respective mating edge, 12b, 13a so that no part of the leg edge 12b, 13a extends beyond that of the other triangles edge which produces the isosceles triangles 60.

Figure 5:
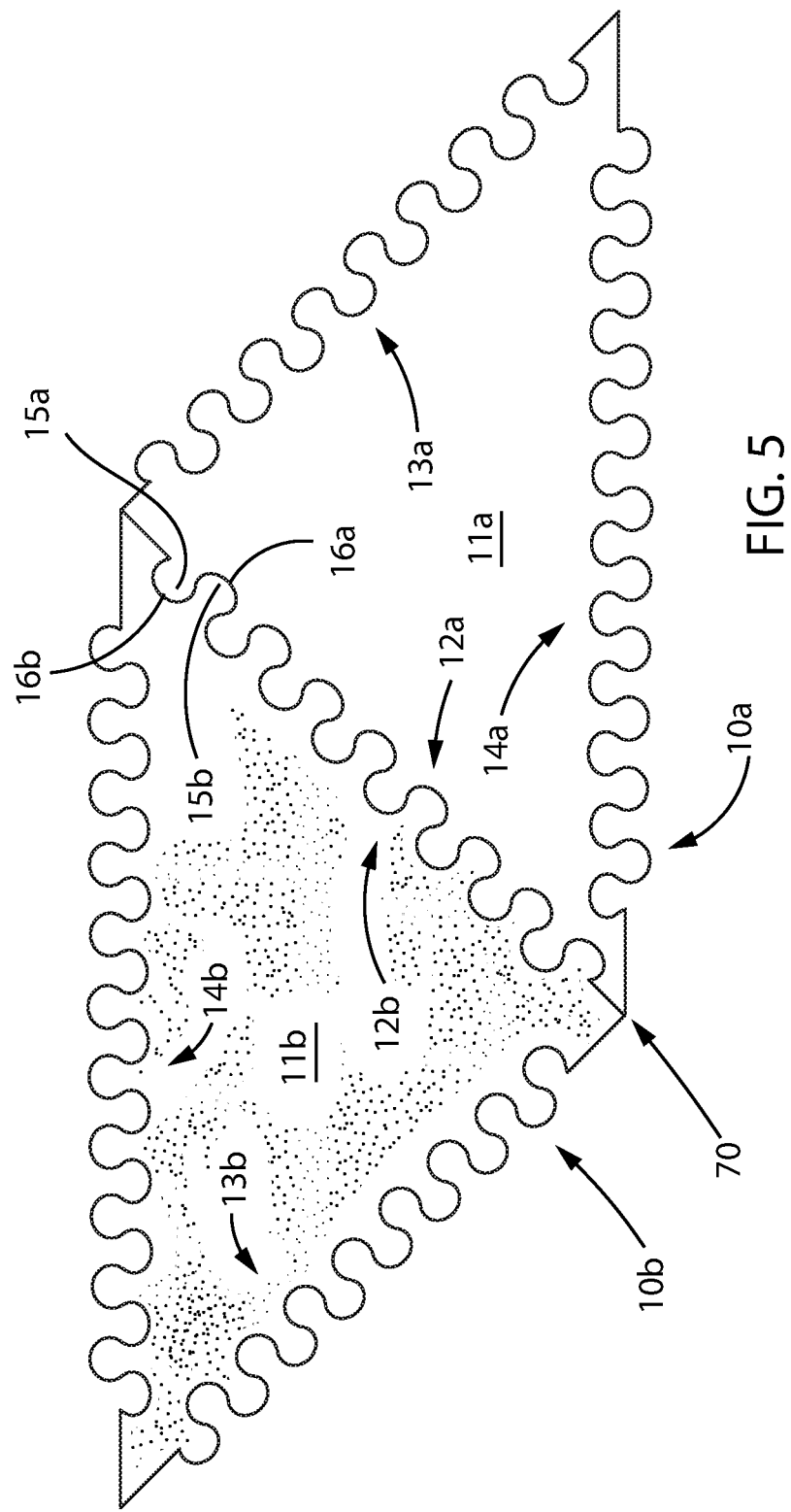
FIG. 5 illustrates two triangle shaped tiles each having a different color joined together at respective right angle leg edges to form a parallelogram, in accordance with the present invention.

Referring now to FIG. 5 along with FIG. 2, parallelogram 70 is formed by interlocking or mating triangle tile 10a with triangle tile 10b along respective right leg sides 12a, 12b. As with square 50 (FIG. 3) and isosceles triangle 60 (FIG. 4), the leg edges to 12a, 12b matingly engage along the entire mated edge with no overhang thus forming the parallelogram 70.

Although triangle tile 10a has a white color surface 11a and triangle tile 10b has a black front surface 11b, triangle tiles 10 can have a third, fourth or other colors or patterns if desired in order to produce an even larger number of different patterns when laid out and interconnected with one another. Similarly, the edge tiles 20, 30, 40 may have a white color, black color or other colors or patterns if desired.

Figure 6:
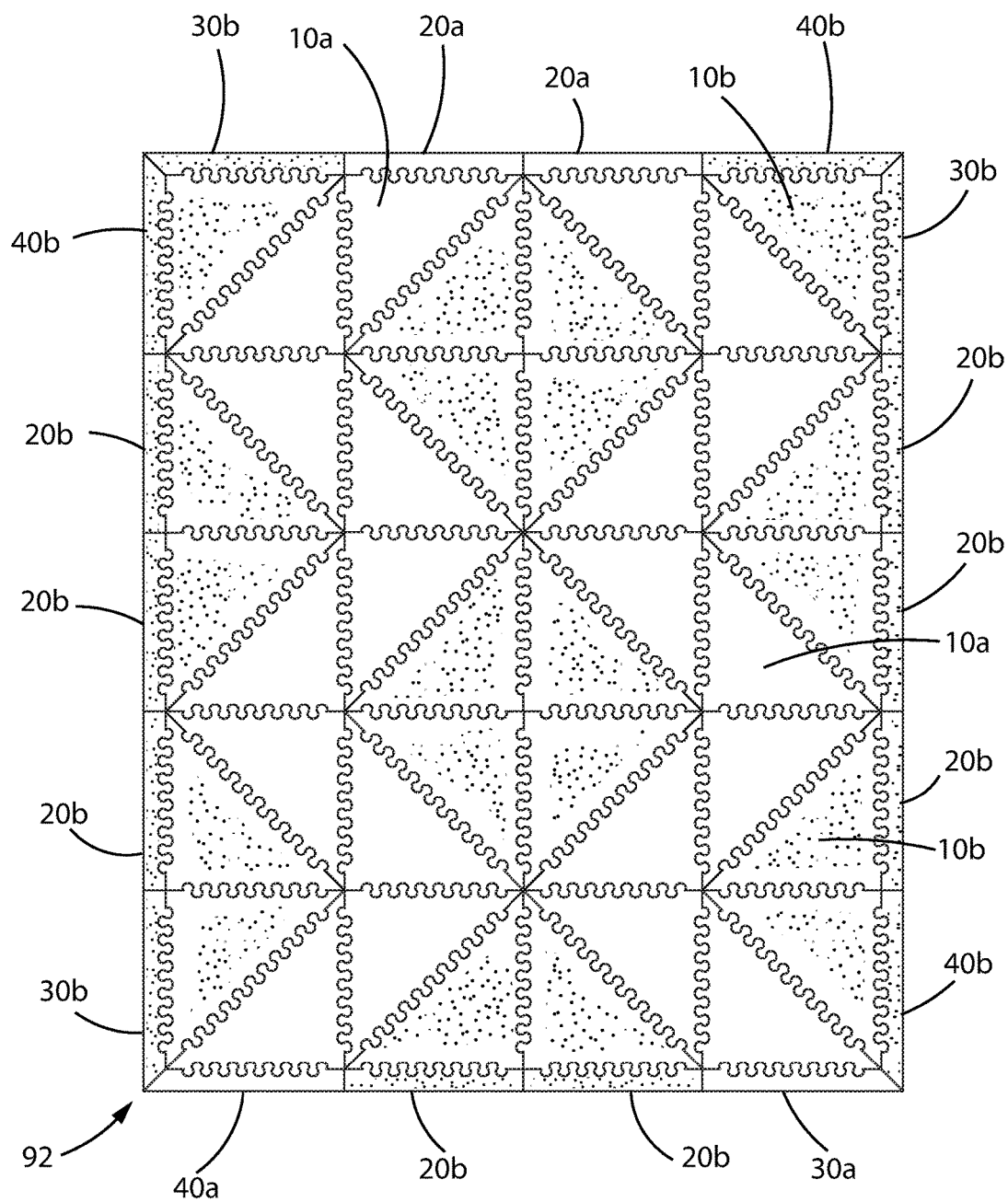
FIG. 6 illustrates one possible pattern produced using individual triangle tiles of either black or white, in accordance with the present invention.
Figure 7:
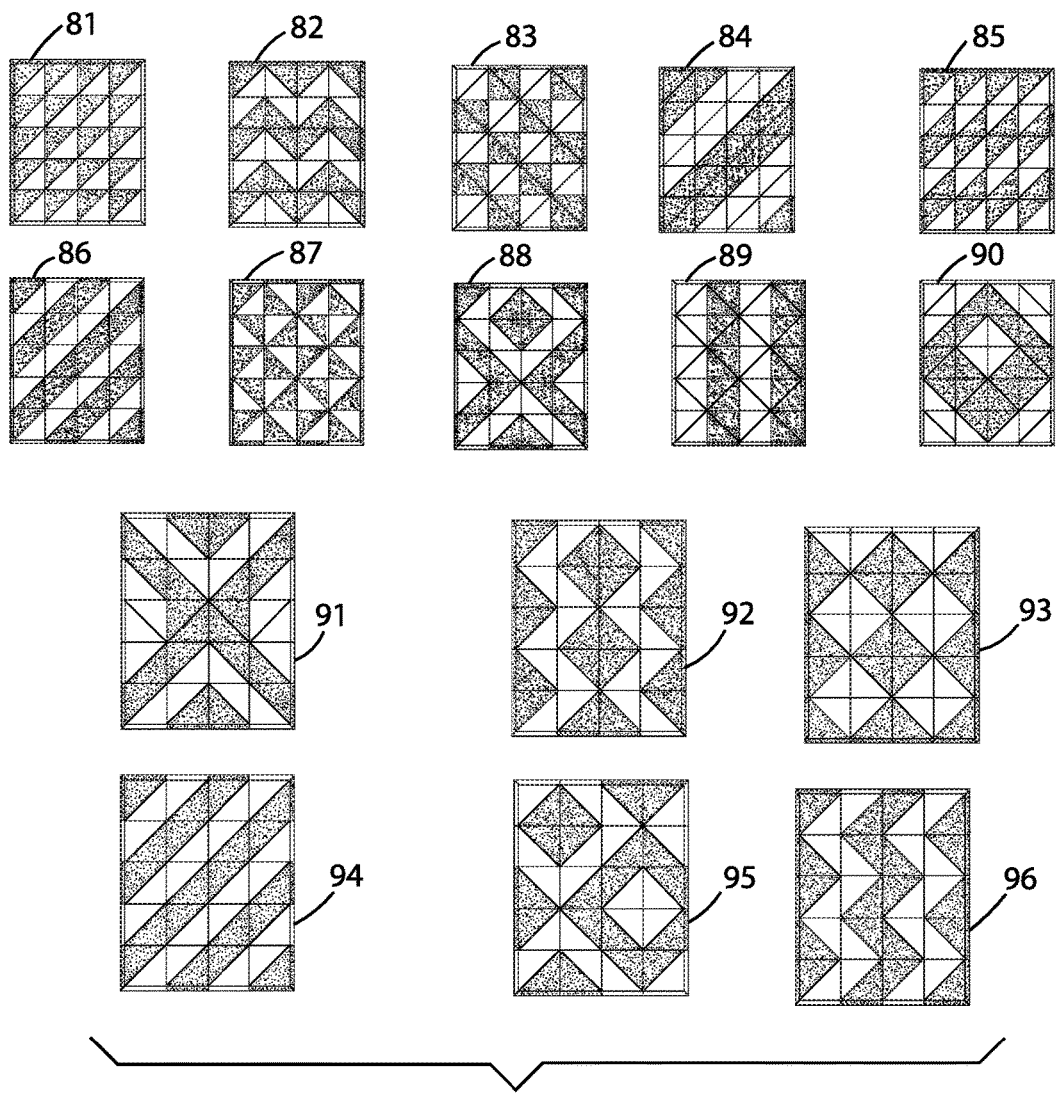
FIG. 7 illustrates sixteen different possible patterns which can be created using 40 triangle tiles having one of two colors or patterns in accordance with the present invention.

Referring now to FIGS. 6 and 7, the triangle tiles 10 and edge tiles 20, 30, 40 for example triangle tiles 10a and 10b and edge tiles 20, 30, 40 can be laid out and interlocked together to form any number of different patterns including but not limited to patterns 81-96 those shown in FIG. 7. Referring specifically to the pattern in FIG. 6, pattern 92 is composed of 40 triangle tiles (20 triangle tiles 10a and 20 triangle tiles 10b) along with a number of straight edge tiles 20a, 20b, right corner tiles 30a, 30b and left corner tiles 40a, 40b.

Referring now to FIG. 7, sixteen patterns are shown as a representative of merely some possible patterns which can be made by selectively interlocking the triangle tiles and in a two color or pattern playmat system. If three, four or more color or pattern tiles are used, even more patterns are possible by selectively interlocking the triangle tiles.

It will be clear that the present playmat system provides advantages and benefits not found in prior playmats. The two color or pattern front surface of the triangle tiles allow for numerous different and interesting patterns to be made including but not limited to those in FIG. 7. If additional color or pattern tiles are used, even more patterns or colors can be made to allow for interesting and aesthetically pleasing patterns when laid out and interconnected with one another to form a playmat.

In addition, the edges provide for a smooth perimeter of the playmat when laid out to provide for a clean appearance. Further, since the edge tiles can have a color or pattern which matches that of the triangle tiles to which the edge tiles are joined, the pattern laid out in the triangle tiles can follow through to the edge for instance as shown in the different configurations 81-96 in FIG. 7. For example, in pattern 92 (FIG. 6), the upper right corner triangle tile 10 is black as are joined right corner tile 30b and left corner 40b.

One of ordinary skill in the art will recognize that additional embodiments are also possible without departing from the teachings of the presently-disclosed subject matter. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and can be made without departing from the spirit and scope of the presently-disclosed subject matter.

The invention claimed is:

1. A playmat system comprising:
  at least eight right isosceles triangle shaped tiles, each tile having two triangle leg edges which form a right angle and a hypotenuse edge, opposite the right angle, each triangle tile has a front surface and a bottom surface, each front surface having one of at least two patterns or colors, wherein at least one of the triangle tiles has a first color or pattern and at least one triangle tile has a second pattern or color, each triangle shaped tile having a series of projections and recesses along the two leg edges and the hypotenuse edge;
  wherein a first plurality of the at least eight triangles having their respective front surfaces in the first pattern or color and a second plurality of the at least eight triangles have their respective front surfaces in the second pattern or color;
  each leg edge of any one triangle tile can matingly engages with both leg edges of any other triangle tile completely along each respective tiles mated edge, thereby forming either a new isosceles triangle twice the size of each triangle tile or a parallelogram depending on orientation of one the mating triangle tiles relative to the other mating triangle tiles, hypotenuse edges of any two triangle tiles can matingly engage with each other, completely along each respective hypotenuse edges to thereby form a square; and
  a plurality of edge tiles, each edge tile having a substantial straight edge and an opposite edge with a series of projections and recesses which are complementary to, and can matingly engage with the projections and recesses in the leg edges of the triangle tiles, each edge tile having a front surface having at least one of two patterns or colors,
  wherein a first plurality of the edge tiles have their respective front surfaces in the first pattern or color and a second plurality of the edge tiles have their respective front surfaces in the second pattern or color.

2. The playmat system of claim 1, wherein the front surface of half of the at least eight triangles have the first pattern or color and the front surface of the other half have the second pattern or color.

3. The playmat system of claim 1, wherein the triangle tiles and the edge tiles are composed of foam.

4. The playmat system of claim 1, wherein the front surface of the triangle tiles are textured.

5. The playmat system of claim 4, wherein the bottom surface of the triangle tiles are smooth.

6. The playmat of claim 1, wherein the at least eight triangle tiles comprises at least 18 tiles.

7. The playmat of claim 6, wherein the front surface of half of the at least 18 triangles have the first pattern or color and the other half have the second pattern or color.

8. The playmat of claim 6, wherein the at least two patterns or colors comprises four patterns or colors and wherein:
  a first quarter of the at least 18 triangles have the front surface in a first one of the four patterns or colors;
  a second quarter of the at least 18 triangles have the front surface in a second one of the four patterns or colors;
  a third quarter of the at least 18 triangles have the front surface in a third one of the four patterns or colors; and
  a four quarter of the at least 18 triangles have the front surface in a fourth one of the four patterns or colors.

9. The playmat of claim 6, wherein the plurality of edge tiles comprises straight edge tiles, right corner tiles and left corner tiles,
  the straight edge tiles having two parallel side edges, on opposite ends of the straight edge tile, and perpendicular to the straight edge, a first plurality of the straight tiles having the front surface in the first pattern or color and a second plurality of the straight tiles having the front surface in the second pattern or color,
  the right corner tiles having a right side edge perpendicular to the straight edge and an left side angled edge, angled inward the right side edge and towards the series of projections and recesses on the edge tile, and at a 45 degree to the straight edge, a first plurality of the right corner tiles having the front surface in the first pattern or color and a second plurality of the right tiles having the front surface in the second pattern or color, and
  the left corner tiles having a left side edge perpendicular to the straight edge on one side and a right side angled edge opposite, thereof, and angled inwards the left side edge and towards the series of projections and recesses on the edge file, and at a 45 degree to the straight edge a first plurality of the left corner tiles having the front surface in the first pattern or color and a second plurality of the left tiles having the front surface in the second pattern or color.

10. The playmat of claim 9, wherein each edge tile has a textured front surface.

11. The playmat of claim 1, wherein the at least eight triangle tiles comprises at least 40 tiles.

12. The playmat of claim 11, wherein the front surface of half of the at least 40 triangles have the first pattern or color and the other half have the second pattern or color.

13. The playmat of claim 11, wherein the at least two patterns or colors comprises four patterns or colors and wherein:
  a first quarter of the at least 40 triangles have the front surface in a first one of the four patterns or colors;
  a second quarter of the at least 40 triangles have the front surface in a second one of the four patterns of colors;
  a third quarter of the at least 40 triangles have the front surface in a third one of the four patterns or colors; and
  a four quarter of the at least 40 trangles have the front surface in a fourth one of the four patterns or colors.

14. The playmat of claim 11, wherein the plurality of edge tiles comprises straight edge tiles, right corner tiles and left corner tiles,
  the straight edge tiles having two parallel side edges, on opposite ends of the straight edge tile, and perpendicular to the straight edge, a first plurality of the straight tiles having the front surface in the first pattern or color and a second plurality of the straight tiles having the front surface in the second pattern or color,
  the right corner tiles having a right side edge perpendicular to the straight edge and an left side angled edge, angled inward the right side edge and towards the series of projections and recesses on the edge tile, and at a 45 degree to the straight edge, a first plurality of the right corner tiles having the front surface in the first pattern or color and a second plurality of the right tiles having the front surface in the second pattern or color, and the left corner tiles having a left side edge perpendicular to the straight edge on one side and a right side angled edge opposite, thereof, and angled inwards the left side edge and towards the series of projections and recesses on the edge tile, and at a 45 degree to the straight edge, a first plurality of the left corner tiles having the front surface in the first pattern or color and a second plurality of the left tiles having the front surface in the second pattern or color.

15. The playmat of claim 14, wherein the plurality of edge tiles comprises 16 straight edge tiles, eight right corner tiles and eight left corner tiles.

16. The playmat of claim 15, wherein the front surface of half of the at least 40 triangles having a front surface in the first pattern or color and the other half have the second pattern or color.

17. The playmat system of claim 11, wherein the triangle tiles and the edge tiles are composed of foam.

18. The playmat of claim 14, wherein the at least two patterns or colors comprises four patterns or colors and wherein:

a first quarter of the at least 40 triangles have the front surface in a first one of four patterns or colors, a second quarter of the at least 40 triangles have the front surface in a second one of the four patterns or colors, a third quarter of the at least 40 triangles have the front surface in a third on of the four patterns or colors, a four quarter of the at least 40 triangles have the front surface in a fourth one of the four patterns or colors.

19. The playmat of claim 18, wherein:

a third plurality of the straight edge tiles, left edge tiles and right edge tiles each have the respective front surfaces in the third one of the four patterns or colors; and a fourth plurality of the straight edge tiles, left edge tiles and right edge tiles each have the respective front surfaces in the fourth one of the four patterns or colors.

20. The playmat of claim 16, wherein:

a first plurality of the straight edge tiles have the front surface in the first pattern or color and a second plurality have the second pattern or color, a first plurality of the right edge tiles have the front surface in the first pattern or color and a second plurality of the right edge tiles have the second pattern or color, and a first plurality of he left straight edge tiles have the front surface in the first pattern or color and a second plurality of the left straight edge tiles have the second pattern or color.

* * * * *